United States Patent
Chan et al.

(10) Patent No.: US 10,392,196 B1
(45) Date of Patent: Aug. 27, 2019

(54) CHAIN WHEEL TRANSMISSION GUIDE MECHANISM FOR USE IN CONDOM PRODUCTION

(71) Applicants: Victor W. J. Chan, Taipo, New Territories (HK); Genie Geraldine Lam, Taipo, New Territories (HK); Rulin Chen, Guangzhou, Guangdong (CN)

(72) Inventors: Victor W. J. Chan, Taipo (HK); Genie Geraldine Lam, Taipo (HK)

(73) Assignees: Victor W. J. Chan, Taipo (HK); Genie Geraldine, Taipo (HK); Rulin Chen, Guangdong (CN)

( * ) Notice: Subject to any disclaimer, the term of this patent is extended or adjusted under 35 U.S.C. 154(b) by 0 days.

(21) Appl. No.: 15/971,179

(22) Filed: May 4, 2018

(51) Int. Cl.
| | | |
|---|---|---|
| *B65G 23/14* | (2006.01) |
| *B65G 17/40* | (2006.01) |
| *B65G 23/10* | (2006.01) |
| *B65G 17/32* | (2006.01) |
| *B29C 35/00* | (2006.01) |
| *B29C 35/02* | (2006.01) |
| *B29C 41/46* | (2006.01) |
| *B29C 41/14* | (2006.01) |

(52) U.S. Cl.
CPC ............ *B65G 23/14* (2013.01); *B29C 35/002* (2013.01); *B29C 35/0277* (2013.01); *B29C 41/14* (2013.01); *B29C 41/46* (2013.01); *B65G 17/32* (2013.01); *B65G 17/40* (2013.01); *B65G 23/10* (2013.01); *B65G 2201/02* (2013.01)

(58) Field of Classification Search
CPC ...... B65G 17/20; B65G 21/22; B65G 19/025; B65G 17/32; B65G 43/08
USPC ........................... 198/678.1, 683, 687, 465.4
See application file for complete search history.

(56) References Cited

U.S. PATENT DOCUMENTS

| | | | | |
|---|---|---|---|---|
| 2,742,017 A | * | 4/1956 | Kennedy ................. | C23D 5/00 198/680 |
| 3,854,439 A | * | 12/1974 | Harmuth ............. | B05B 13/0235 118/324 |
| 4,029,199 A | * | 6/1977 | Reens ................... | B65G 17/20 198/683 |
| 4,212,384 A | * | 7/1980 | Grube ................... | B65G 17/20 198/684 |
| 4,490,922 A | * | 1/1985 | Gorodetsky ......... | B23K 35/404 198/679 |

* cited by examiner

*Primary Examiner* — James R Bidwell
(74) *Attorney, Agent, or Firm* — Brooks Kushman P.C.

(57) ABSTRACT

A chain wheel transmission guide mechanism for use in condom production having a rack and a mold frame. The rack is provided with a chain wheel assembly and an auxiliary rail assembly arranged in parallel with a chain of the chain wheel assembly. The auxiliary rail assembly has an upper load bearing guide rail and a lower limiting guide rail respectively disposed on the top and bottom of the rack. The chain wheel assembly has a chain wheel and a chain connected to the mold frame, and the mold frame is movably and cooperatively connected to an auxiliary rail assembly through a sliding part.

10 Claims, 6 Drawing Sheets

CHAIN WHEEL TRANSMISSION GUIDE MECHANISM FOR USE IN CONDOM PRODUCTION

TECHNICAL FIELD

The present invention relates to the field of condom production, and particularly to a chain wheel transmission guide mechanism for use in condom production.

BACKGROUND

In existing condom production lines, the axis of a chain wheel of a chain wheel mechanism is arranged in parallel to the horizontal plane, and a mold body is directly mounted on a chain so as to drive the mold body to complete the dipping production of products by changing the trajectory of the chain itself. As the mold body is suspended on the chain of the chain wheel mechanism, the chain bears the weight of the mold body and drags the mold body to move and complete the dipping production of products. In this type of dipping process, the dipping production process of products depends entirely on the shape of the chain, such as the latex dipping process which depends on the bending shape and direction of the chain to dip products into the latex dipping pool. The chain will sag due to gravity, which causes the chain to be vulnerable to shaking during operation, causing the products to shift or sway back and forth in the process of chain transmission, and especially adversely affecting the even latex dipping of the latex dipping process.

In order to improve the operational stability of the chain, it is necessary to apply a greater tension force on the chain. However, over time the application of a greater tension force will shorten the chain's lifespan. Moreover, the chain lacks effective positional limitations, which leads to a problem of, during the operation of the chain wheel assembly, the chain swinging left and right on the horizontal plane, and the products suspended under the chain also swinging with it, resulting in uneven latex dipping. In addition, after the mold body turns over toward the top of the chain wheel with the guidance of the chain, the mold body can only perform the baking process and cannot perform processes like dipping, and therefore the part of the chain over the chain wheel is in the idle state, and the moving trajectory of the part of the chain over the chain wheel is wasted. Here, as the mold body is directly mounted on the chain, after the mold body enters into the baking process, the chain will also be baked together with the mold body, and the drastic change of temperature will shorten the chain's lifespan further. As the axis of the chain wheel is arranged horizontally, adjacent mold bodies need to reserve enough space between them to ensure that adjacent mold bodies will not collide because of the bending of the chain, but with the increase of the spacing between adjacent mold bodies, the equipment cost will increase, and the volume of production will decrease.

Condom production systems that avoid at least some or all of the aforementioned problems are desirable.

SUMMARY OF INVENTION

In order to solve the above-mentioned problem, the present invention provides a chain wheel transmission guide mechanism for use in condom production, which comprises a rack and a mold frame, wherein the rack is provided with a horizontally arranged chain wheel assembly and two sets of auxiliary rail assembles arranged in parallel with a chain of the chain wheel assembly, each set of the auxiliary rail assemblies comprises an upper load bearing guide rail and a lower limiting guide rail which are disposed in parallel, and the chain wheel assembly comprises two chain wheels which are respectively located at both ends in the length direction of the rack and are axially perpendicular to a horizontal plane and the chain connecting and meshing the two chain wheels; the mold frame is connected to the chain, the upper and lower ends of the mold frame are respectively provided with an upper sliding part and a lower sliding part, and the mold frame is movably and cooperatively connected to the upper load bearing guide rail and the lower limiting guide rail respectively through the upper sliding part and the lower sliding part; and the mold frame moves along the auxiliary rail assembly under the traction of the chain.

In some embodiments, the auxiliary rail assembly is disposed around the rack.

In some embodiments, the rack is provided with a guiding assembly in parallel with the chain, the mold frame comprises a vertically disposed lifting guide rail and a mold mounting part movably and cooperatively connected to the lifting guide rail, the mold mounting part is provided with a guide wheel, and the guide wheel is movably and cooperatively connected to the guiding assembly; and when the chain pulls the mold frame to slide on the auxiliary rail assembly, the guide wheel brings the mold mounting part to slide along the lifting guide rail under the guidance of the guiding assembly.

In some embodiments, the guiding assembly comprises a labor division apparatus and a labor division guide rail and a guiding guide rail which are spaced apart vertically, the labor division apparatus comprises a rail splitting apparatus and a rail merging apparatus, and the labor division guide rail and the guiding guide rail are respectively provided with a rail splitting apparatus and a rail merging apparatus therebetween.

In some embodiments, the labor division guide rail is a curve rail, a straight rail or a polyline rail.

In some embodiments, the guiding guide rail is a curve rail, a straight rail or a polyline rail.

In some embodiments, the rail splitting apparatus comprises a rail splitting enforcement part and a rail splitting drive part, and the labor division guide rail and the guiding guide rail are provided with a rail splitting gap therebetween; and the rail splitting enforcement part has a rail sealing position and a rail abdicating position, when the rail splitting enforcement part switches from the rail abdicating position to the rail sealing position, the rail splitting drive part pushes the rail splitting enforcement part into the rail splitting gap, and the guide wheel switches from the guiding guide rail to the labor division guide rail through the guidance of the rail splitting enforcement part; and when the rail splitting enforcement part switches from the rail sealing position to the rail abdicating position, the rail splitting drive part pulls the rail splitting enforcement part out of the rail splitting gap, and the guide wheel moves along the guiding guide rail.

In some embodiments, the rail merging apparatus comprises a rail merging block, the labor division guide rail and the guiding guide rail are provided with a rail merging gap therebetween, and the rail merging block is located inside the rail merging gap and a fixed end of the rail merging block is provided with a spindle; and the spindle and the rail merging block are provided with a torsional spring therebetween, and two ends of the torsional spring are respectively connected to the spindle and the rail merging block to make a free end of the rail merging block deviate from the guiding guide rail.

In some embodiments, the rail merging apparatus comprises a rail merging enforcement part and rail merging drive part, and the labor division guide rail and the guiding guide rail are provided with a rail merging gap there between; and the rail merging enforcement part has a rail sealing position and a rail abdicating position, in the process that the guide wheel switches from the labor division guide rail to the guiding guide rail, the rail merging enforcement part switches from the rail abdicating position to the rail sealing position to make the rail merging drive part push the rail merging enforcement part into the rail merging gap, and the guide wheel rolls over the rail merging enforcement part from the labor division guide rail and switches into the guiding guide rail; and in the process that the guide wheel continues moving on the guiding guide rail, the rail merging enforcement part switches from the rail sealing position to the rail abdicating position to make the rail merging drive part pull the rail merging enforcement part out of the rail merging gap, and the guide wheel continues moving along the guiding guide rail.

In some embodiments, the rack comprises a plurality of sections of head-to-tail rack modules, and the two chain wheels are respectively located at the head and the tail of the rack modules.

In the chain wheel transmission guide mechanism for use in condom production of the present invention, the axis of the chain wheel of the chain wheel assembly is arranged perpendicular to the horizontal plane, and the mold frame is movably and cooperatively connected to the auxiliary rail assembly through the sliding part, and enables the whole section of the chain to be provided with different processes, which improves the utilization of the chain and reduces the equipment cost. The chain of the chain wheel assembly only provides a traction force to pull the mold frame to slide along the auxiliary rail assembly, and with the addition of the load bearing and position limitation functions of the auxiliary rail assembly to the mold frame, the chain does not need to bear the weight of the products any more. Moreover, due to the cooperation of the mold frame and the auxiliary rail assembly, the movement direction of the chain is perpendicular to the direction of gravity and reduces gravity's influence on the operation of the chain, which greatly reduces the burden of the chain and ensures the chain's life. Also because the mold bodies are not directly connected to the chain, the bending of the chain will not cause adjacent mold bodies to collide, the spacing between adjacent mold bodies can be further decreased, and the volume of production can be increased. Moreover, due to the indirect connection of the chain and the mold bodies, the lubricating oil on the chain will not contaminate the mold bodies.

Figure 1:
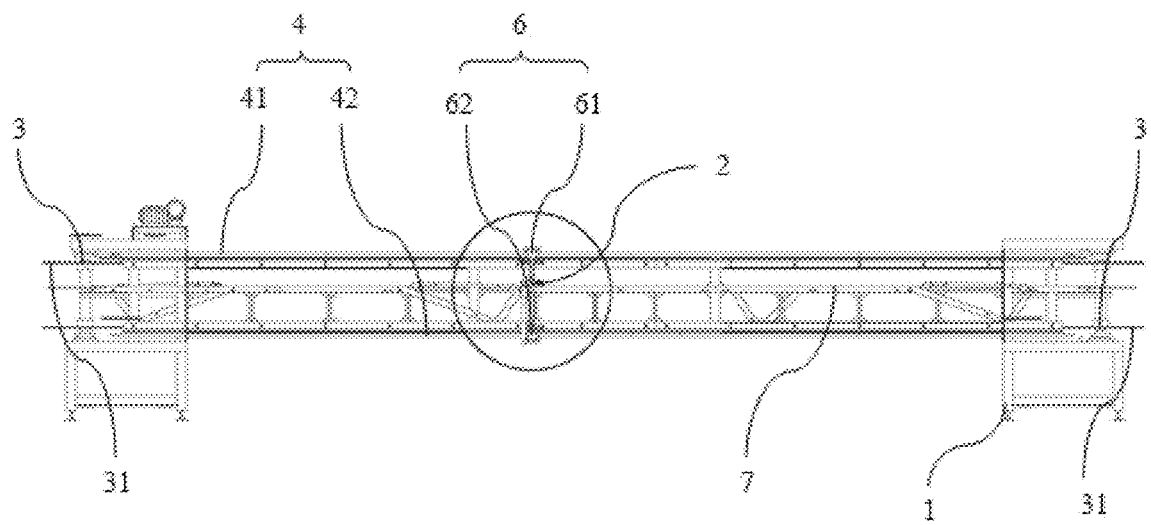
FIG. 1 is a schematic diagram of a front view of a chain wheel transmission guide mechanism for use in condom production of the embodiments of the present invention.
Figure 2:
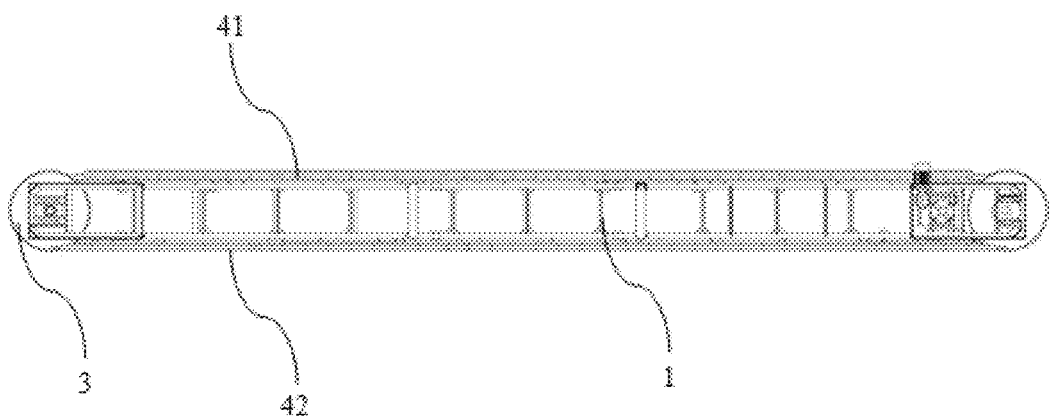
FIG. 2 is a schematic diagram of a top view of the chain wheel transmission guide mechanism for use in condom production of the embodiments of the present invention.
Figure 3:
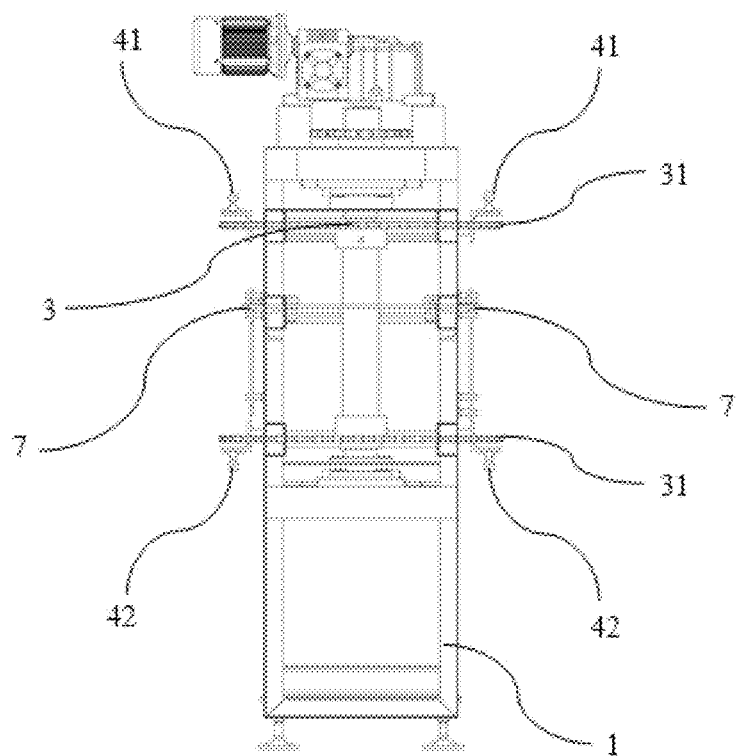
FIG. 3 is a schematic diagram of a side view of the chain wheel transmission guide mechanism for use in condom production of the embodiments of the present invention.
Figure 4:
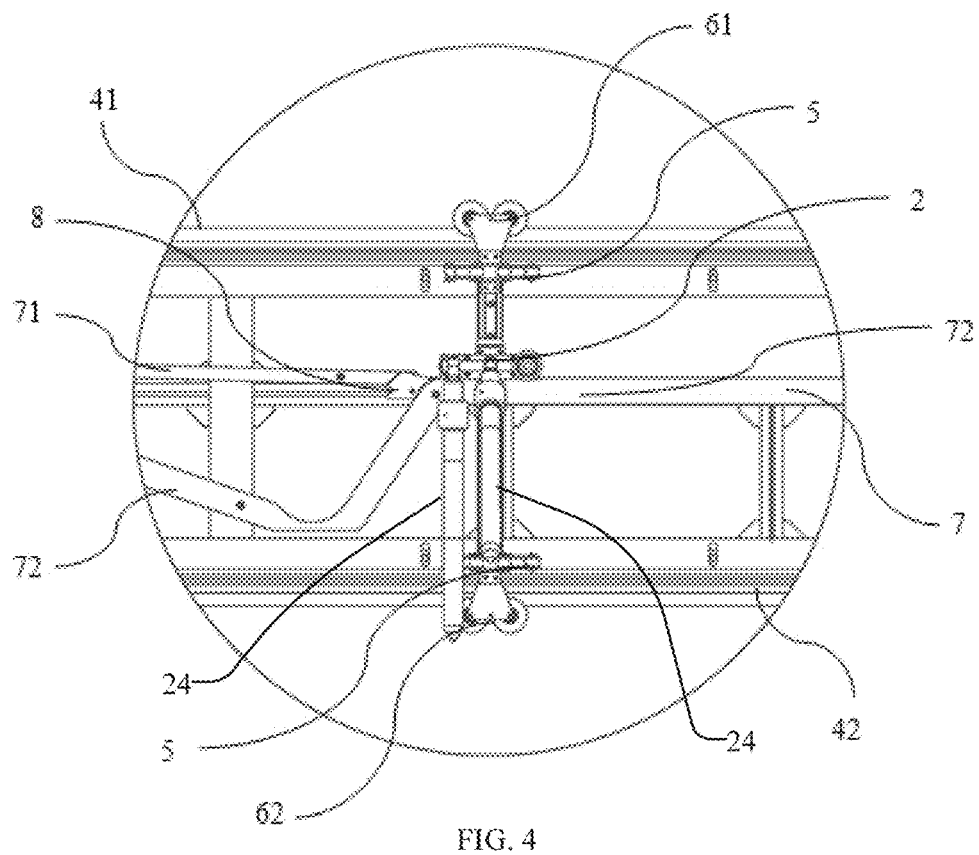
FIG. 4 is a schematic diagram of a mold frame of the chain wheel transmission guide mechanism for use in condom production of the embodiments of the present invention.
Figure 5:
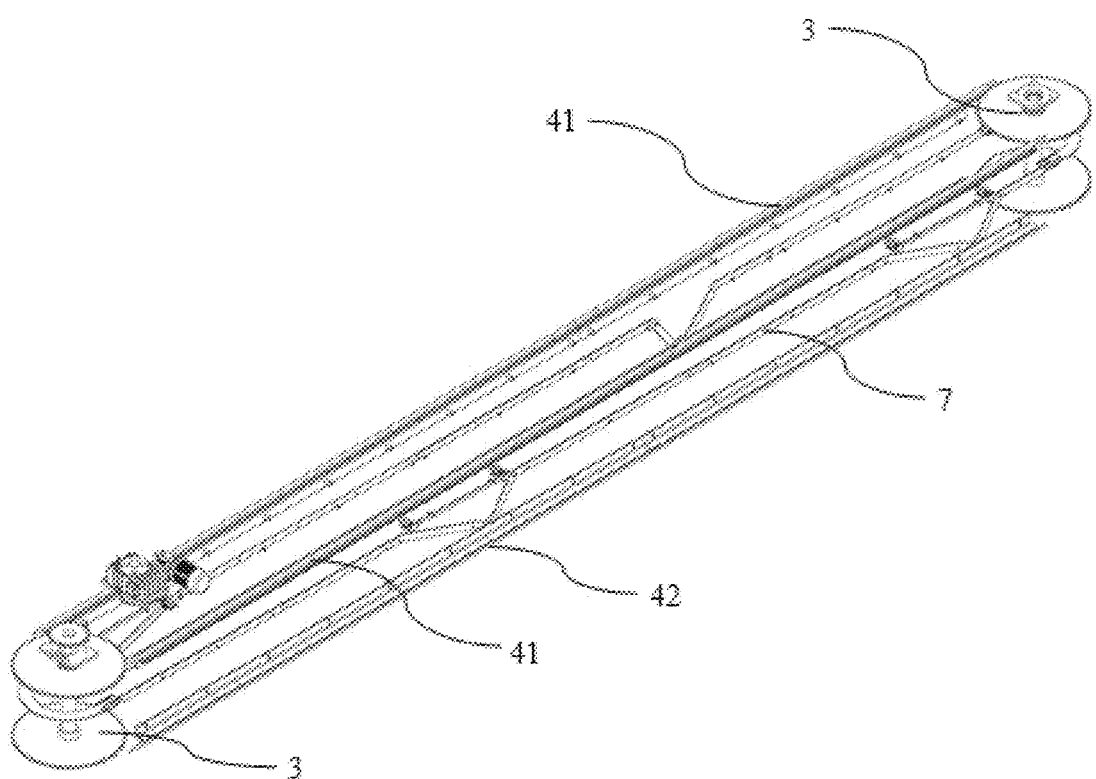
FIG. 5 is a stereo schematic diagram of a part of the chain wheel transmission guide mechanism for use in condom production of the embodiments of the present invention.
Figure 6:
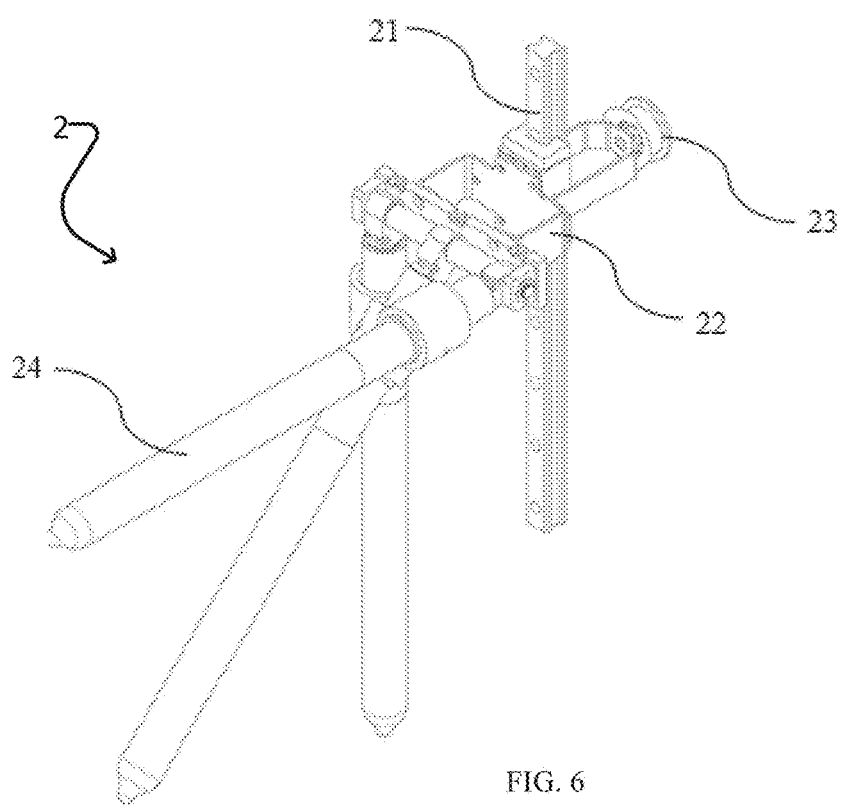
FIG. 6 is a schematic diagram of a mold mounting part of the chain wheel transmission guide mechanism for use in condom production of the embodiments of the present invention.
Figure 7:
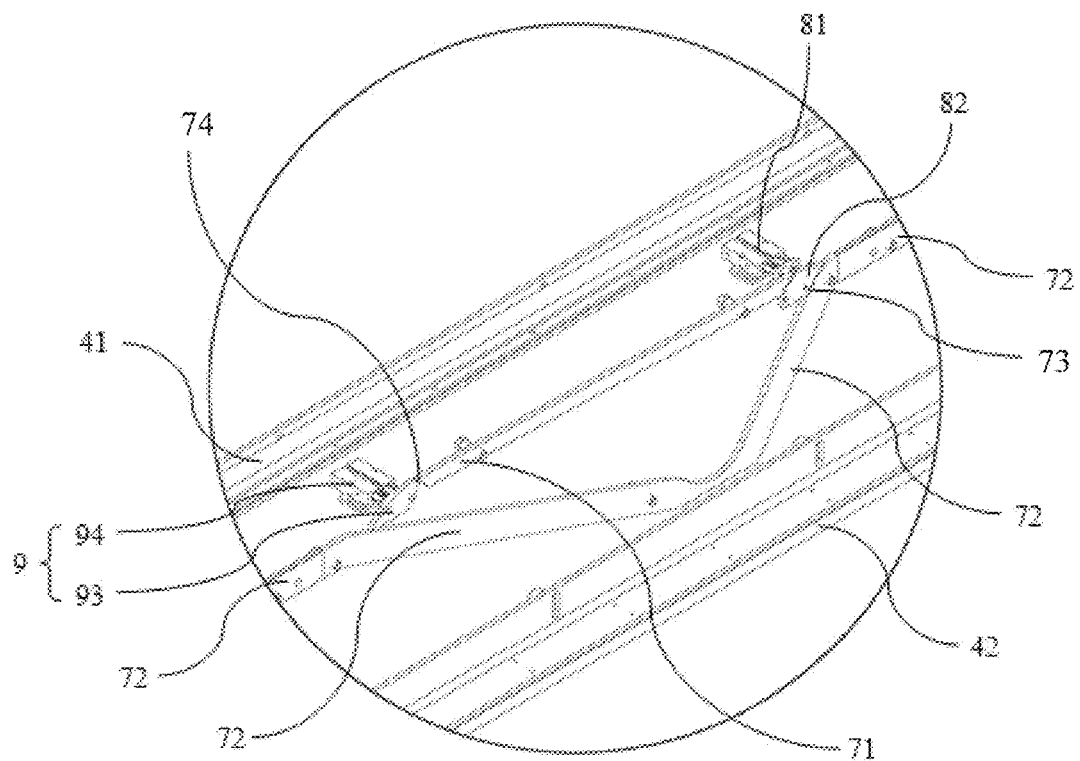
FIG. 7 is a schematic diagram of a part of a guiding assembly of the chain wheel transmission guide mechanism for use in condom production of the embodiments of the present invention.
Figure 8:
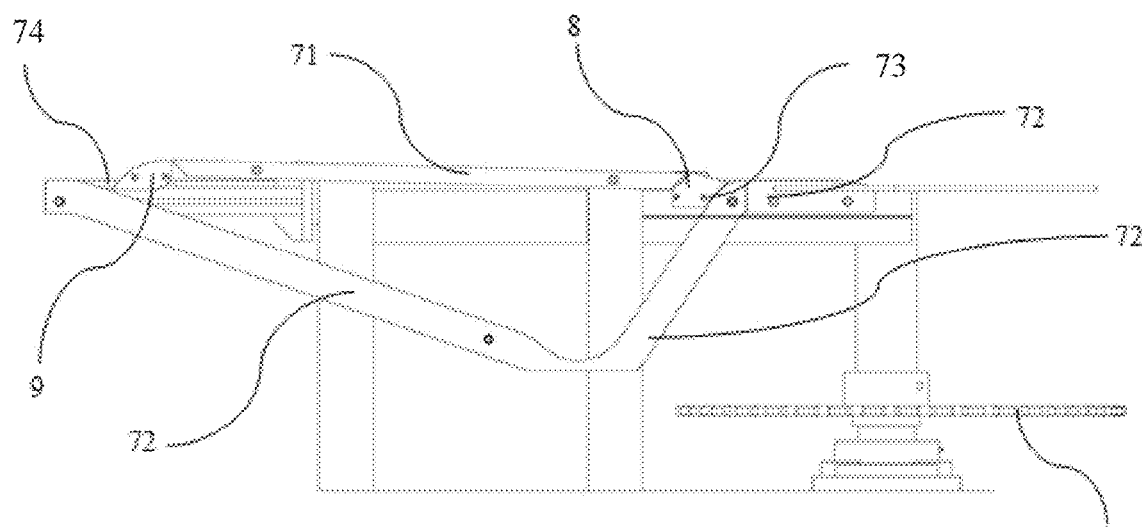
FIG. 8 is the first schematic diagram of a rail changing apparatus of the chain wheel transmission guide mechanism for use in condom production of the embodiments of the present invention.
Figure 9:
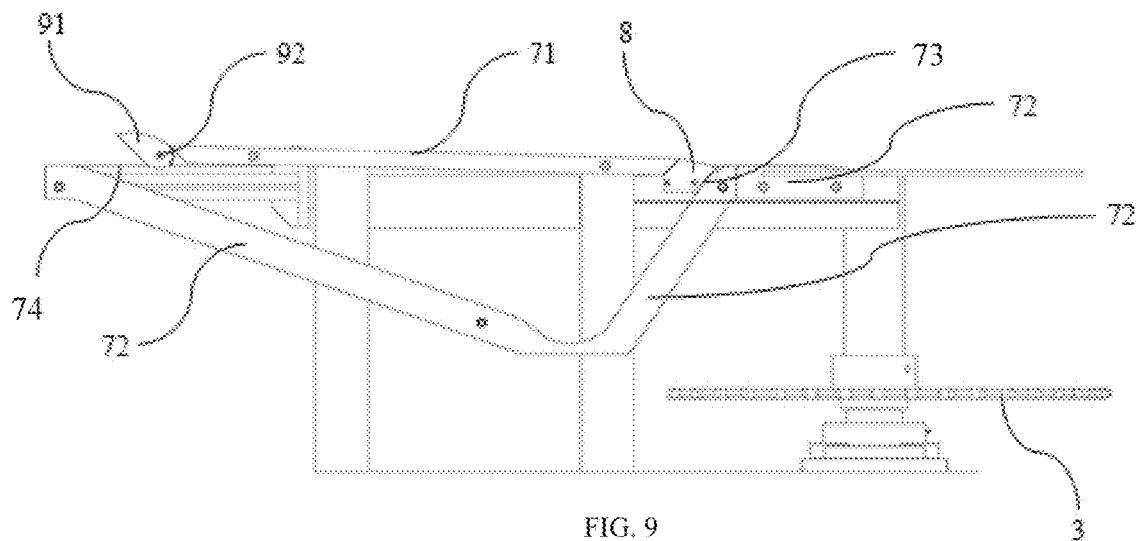
FIG. 9 is the second schematic diagrams of the rail changing apparatus of the chain wheel transmission guide mechanism for use in condom production of the embodiments of the present invention.

Here, 1, Rack; 11, Rack module; 2, Mold frame; 21, Lifting guide rail; 22, Mold mounting part; 23, Guide wheel; 24, Mold body; 3, Chain wheel assembly; 31, Chain wheel; 4, Auxiliary rail assembly; 41, Upper load bearing guide rail; 42, Lower limiting guide rail; 5, Chain; 6, Sliding part; 61, Upper sliding part; 62, Lower sliding part; 7, Guiding assembly; 71, Labor division guide rail; 72, Guiding guide rail; 73, Rail splitting gap; 74, Rail merging gap; 8, Rail splitting apparatus; 81, Rail splitting drive part; 82, Rail splitting enforcement part; 9, Rail merging apparatus; 91, Rail merging block; 92, Spindle; 93, Rail merging enforcement part; 94, Rail merging drive part.

DETAILED DESCRIPTION

The specific implementation of the present invention is further described in detail as shown in the accompanying drawings and the embodiments. The following embodiments are used to explain the present invention, but not to limit the scope of the present invention.

The chain wheel 31 transmission guide mechanism for use in condom production of the present invention is schematically shown. As shown in FIG. 1 to FIG. 4, which comprises a rack 1 and a mold frame 2, wherein the mold frame 2 is used to bear the mold bodies 24 required for production, and the mold bodies 24 are disposed on the mold frame 2; the rack 1 is provided with a chain wheel assembly 3 and an auxiliary rail assembly 4 arranged in parallel with a chain 5 of the chain wheel assembly 3, the auxiliary rail assembly 4 comprises an upper load bearing guide rail 41 and a lower limiting guide rail 42 which are disposed in parallel, and the chain wheel assembly 3 comprises two chain wheels 31 which are respectively located at both ends in the length direction of the rack 1 and are axially perpendicular to a horizontal plane and the chain 5 connecting and meshing the two chain wheels 31; the axis of the chain wheel 31 of the chain wheel assembly 3 is perpendicular to the horizontal plane and enables the whole section of the chain 5 to be involved in different processes, which greatly improves the utilization of the chain 5 and reduces the equipment cost, but by contrast, the chain wheel 31 of the chain wheel assembly 3 is axially perpendicular to the horizontal plane, and therefore, the chain 5 being in line with the chain wheel 31 thereof can only enter into processes like draining and baking, etc., and other processes such as dipping cannot be added in the operation area of the chain 5 over the chain wheel 31.

The mold frame 2 is connected to the chain 5, the upper and lower ends of the mold frame 2 are respectively provided with an upper sliding part 61 and a lower sliding part 62, and the mold frame 2 is movably and cooperatively connected to the upper load bearing guide rail 41 and the lower limiting guide rail 42 respectively through the upper sliding part 61 and the lower sliding part 62, and the mold frame 2 can slide along the auxiliary rail assembly 4 under the traction of the chain 5, while the upper load bearing guide rail 41 is responsible for bearing the weight of the mold frame 2, and the lower limiting guide rail 42 is used to cooperate with the upper load bearing guide rail 41 to limit the position of the mold frame 2 in the vertical direction.

For the mold frame 2, the auxiliary rail assembly 4 plays the role of load bearing and position limitation, while the chain 5 of the chain wheel assembly 3 only provides a traction force to pull the mold frame 2 to slide along the auxiliary rail assembly 4. Meanwhile, as the chain 5 is connected to the mold frame 2, the cooperation of the mold frame 2 and the auxiliary rail assembly 4 can also support the chain 5 and prevent the chain 5 from sagging due to gravity. Moreover, the movement direction of the chain 5 is perpendicular to the direction of gravity. As such, the chain 5 of the chain wheel assembly 3 is less affected by gravity than a traditional chain wheel assembly 3 (a traditional chain wheel 31 is axially parallel to the horizontal plane) and thus ensures a longer lifespan of the chain 5. Further, as the cooperation of the mold frame 2 and the auxiliary rail assembly 4 and the chain 5 are only responsible for pulling the mold frame 2 to slide on the auxiliary rail assembly 4 and the chain 5 operates more steadily, the chain 5 does not need to be subject to as great a tension force that a chain of a traditional chain wheel assembly would be under. The lifespan of a chain under a greater tension force for extended periods of time will be shortened and result in higher equipment cost.

Also in the present invention because the mold bodies 24 are not directly connected to the chain 5, but are indirectly connected through an assembly such as the mold frame 2, the bending of the chain 5 will not cause adjacent mold bodies 24 to collide. The spacing between adjacent mold bodies 24 can thus be further decreased, and the volume of production can be increased. Moreover, due to the indirect connection of the chain 5 and the mold bodies 24, the lubricating oil on the chain 5 will not contaminate the mold bodies 24. In some embodiments, the auxiliary rail assembly 4 is disposed around the rack 1. In such embodiments, no matter on which section of auxiliary rail assembly 4 on the rack 1 mold frame 2 moves, the auxiliary rail assembly 4 provides constant bearing capacity and position limitation.

As shown in FIG. 1 to FIG. 9, the rack 1 is provided with a guiding assembly 7 in parallel with the chain 5, the mold frame 2 comprises a vertically disposed lifting guide rail 21 and a mold mounting part 22 movably and cooperatively connected to the lifting guide rail 21, the mold mounting part 22 is provided with a guide wheel 23, and the guide wheel 23 is movably and cooperatively connected to the guiding assembly 7. When the mold frame 2 moves along the auxiliary rail assembly 4, the guide wheel 23 brings the mold mounting part 22 to slide along the lifting guide rail 21 under the guidance of the guiding assembly 7. A mold body 24 required for production is mounted on the mold mounting part 22, and the mold body 24 enters into different positions for processing under the guidance of the guiding assembly 7, the guide wheel 23, the mold mounting part 22, and the lifting guide rail 21. For example, the configuration of guiding assembly 7, and the cooperation between guide wheel 23, the mold mounting part 22, and the lifting guide rail 21 can ensure that the mold bodies 24 are able to vertically dip into or get out of the latex dipping pool, and ensure that the latex dipping of the product is sufficiently even. In addition, since the horizontal spacing between two adjacent mold mounting parts 22 is not affected by the bending of the guiding assembly 7, the mold bodies 24 on different mold mounting parts 22 will avoid collision. By contrast, the chain wheel of a traditional chain wheel assembly is axially parallel to the horizontal plane, and the mold bodies are suspended on a chain thereof. When the mold bodies are ready for dipping latex, the chain under the chain wheel needs to bend or sag downward to guide the mold bodies downward to dip into the latex dipping pool. At such moments, the mold bodies are suspended under the chain 5 and when the chain bends downward, the spacing between the free ends of two adjacent mold bodies will decrease, and if the downward bending or sagging of the chain is relatively large, two adjacent mold bodies will inevitably collide, adversely affecting the product quality on the mold bodies and even cause product damage. Therefore, the degree of bending or sagging of the chain of the traditional chain wheel assembly cannot be too large. FIG. 6 to FIG. 11 show how a variety of products on the same production line can be processed by different processes. For example, some products need to be dipped into the dyeing and dipping pool for the process of dyeing and dipping, while some other products do not need to be dipped into the dyeing and dipping pool for the process of dyeing and dipping, and therefore the guiding assembly 7 has to send different products into different process positions. The guiding assembly 7 comprises a labor division apparatus and a labor division guide rail 71 and a guiding guide rail 72 which are spaced apart vertically. The labor division apparatus comprises a rail splitting apparatus 8 and a rail merging apparatus 9, and the labor division guide rail 71 and the guiding guide rail 72 are respectively provided with a rail splitting apparatus 8 and a rail merging apparatus 9 therebetween. Here, the labor division guide rail 71 is a curve rail, a straight rail or a polyline rail; and the guiding guide rail 72 is a curve rail, a straight rail or a polyline rail.

In the illustrated embodiment, a certain section of the guiding guide rail 72 is provided with a dipping process area, and this section of guiding guide rail 72 is a polyline rail or a curve rail, wherein the polyline rail or curve rail concaves downwardly to guide the mold mounting part 22 to slide downward along the lifting guide rail 21, so as to dip the mold body 24 disposed on the mold mounting part 22 vertically into the latex dipping liquid. Meanwhile, a labor division guide rail 71 in the form of a straight rail is disposed above this section of the guiding guide rail 72. A rail splitting apparatus 8 and a rail merging apparatus 9 are respectively disposed between two end parts of the labor division guide rail 71 and the guiding guide rail 72. The labor division guide rail 71 is used to segregate another type of product that does not need this dipping process from the latex dipping pool here, so that the type of product that does not need this dipping process bypasses the latex dipping pool through the labor division guide rail 71. Therefore, by adjusting the number of dippings of different products, the process that can flexibly adjust products can produce products of different thickness.

Figure 11:
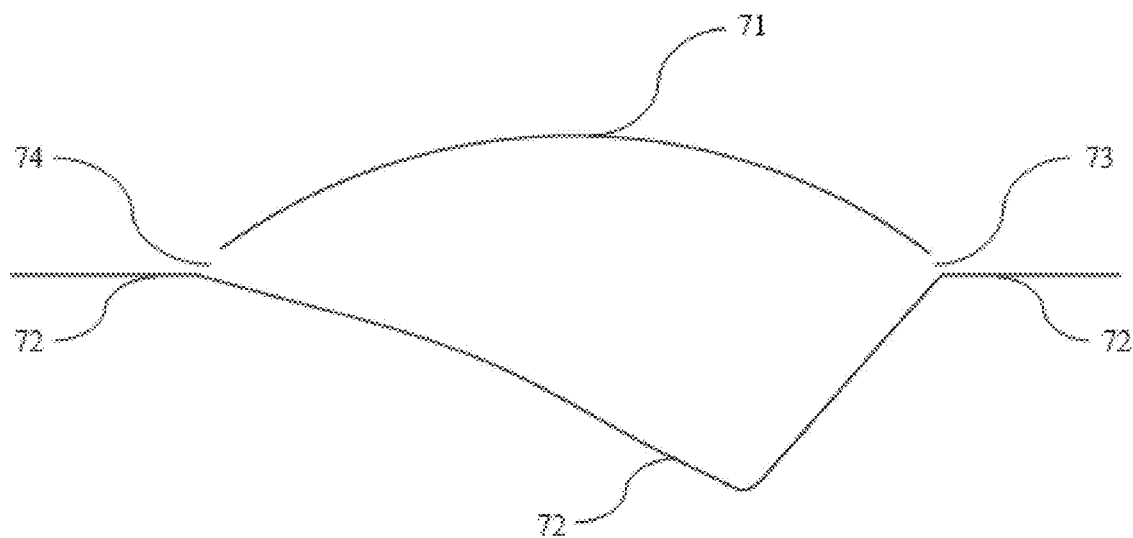
FIG. 11 is the second schematic diagram of the guiding assembly of the chain wheel transmission guide mechanism for use in condom production of the embodiments of the present invention.

In addition, the shapes of the labor division guide rail 71 and the guiding guide rail 72 can also be optimized. As shown in FIG. 11, the labor division guide rail 71 is an upwardly curved rail, and the guiding guide rail 72 is the combination of a straight rail and a curve rail. The upward labor division guide rail 71 is advantageous to increase the spacing between the mold body 24 on the labor division guide rail 71 and the latex dipping pool at this section of the guiding guide rail 72, and prevent the mold body 24 on the labor division guide rail 71 from being contaminated by the latex liquid of the latex dipping pool. The curved section of the guiding guide rail 72 is of a parabolic shape, of which the bending trend from the bottom up smooths gradually. When the guide wheel 23 moves from the bottom to the top in the curved section of the guiding guide rail 72, the speed at which mold body 24 leaves of the latex dipping liquid slows. When the mold body 24 leaves the latex dipping pool quickly, the upper end of the mold body 24 will draw out more latex dipping liquid from the latex dipping pool. When the mold body 24 leaves the latex dipping pool slowly, the latex dipping liquid drawn out at the lower end of the mold body 24 from the latex dipping pool is not as much as the latex dipping liquid drawn out at the upper end thereof. After the mold body 24 leaves the latex dipping pool entirely, the latex dipping liquid attached on the mold body 24 will slowly move from the upper end of the mold body 24 toward the lower end due to gravity. As the latex dipping liquid attached on the upper end is more than that on the lower end when the mold body 24 just leaves the latex dipping pool, the latex dipping liquid will be attached outside the mold body 24 evenly due to gravity, which makes the dipping of latex more even.

The guide rail 71, the guiding guide rail 72 and the labor division apparatus also advantageously reduces costs associated with starting up the equipment. In the traditional condom production line, when an equipment starts up and operates, the latex dipping pool thereof will slowly rise vertically to a predetermined working position thereof. At this moment, the mold body continues moving under the guidance of the chain, and in the process of the slow rise of the latex dipping pool, the mold body which dips into the latex dipping pool first only touches the latex dipping liquid by the lower part of the mold body. In contrast to a saleable product, the latex dipping depth of the product which dips into the latex dipping pool before the latex dipping pool rises to the working position thereof is not enough, and therefore the products with inadequate latex dipping will become non-saleable products, causing significant waste and high equipment start-up costs.

In the present invention, with the labor division guide rail 71 that allows the mold body 24 to bypass the latex dipping pool and a section of a downwardly concave guiding guide rail 72, where this section of guiding guide rail 72 is provided with a latex dipping pool, when the equipment is just started, all the mold bodies 24 can bypass the latex dipping pool through the labor division guide rail 71. After the latex dipping pool slowly rises to a sufficiently working level, the labor division apparatus can guide the mold bodies 24 to enter into the guiding guide rail 72, to make the mold bodies 24 dip into the latex dipping pool. Thus advantageously, during the start-up of the equipment, no mold body 24 will dip into the latex dipping pool prematurely before it reaches a sufficient working level, and thus no wasted product or non-saleable product will be produced, reducing the start-up cost.

Figure 10:
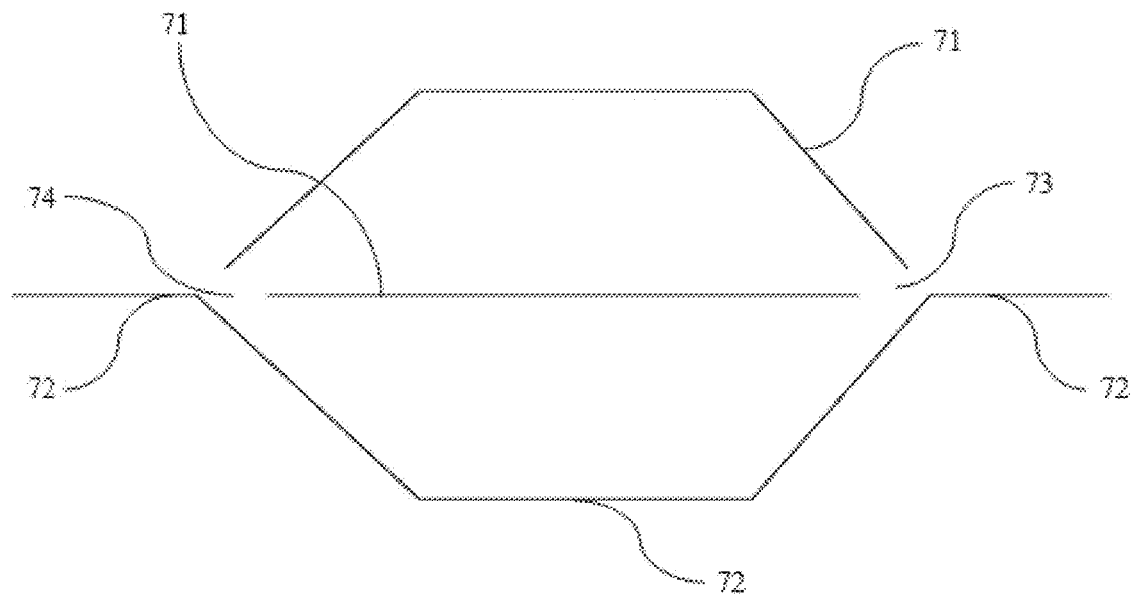
FIG. 10 is the first schematic diagram of a guiding assembly of the chain wheel transmission guide mechanism for use in condom production of the embodiments of the present invention.

In other embodiments, a plurality of labor division guide rails 71 can also be provided. As shown in FIG. 10, the labor division guide rail 71 and the guiding guide rail 72 are spaced apart vertically, and a plurality of labor division guide rails 71 are provided and assigned different functional zones. For example, the first labor division guide rail 71 is a saleable product zone, the second labor division guide rail 71 is a to-be-inspected product zone, and the third labor division guide rail 71 (not shown) is a non-saleable product zone, and so on. The mold mounting part 22 is guided by the rail splitting apparatus 8 between the labor division guide rail 71 and the guiding guide rail 72 to enter into different labor division guide rails 71 or continue to slide on the guiding guide rail 72. Therefore, the rail splitting apparatus 8 is used to guide the mold body 24 on the mold mounting part 22 onto different labor division guide rails 71. Similarly, the rail merging apparatus 9 is used to re-converge mold mounting parts 22 moving on different labor division guide rails 71 onto the guiding guide rail 72. Again, mold mounting part 22 can be guided by the guiding assembly 7 because the guide wheel 23 is disposed on the mold mounting part 22, and the guide wheel 23 moves along the guiding assembly 7.

The rail splitting apparatus 8 comprises a rail splitting enforcement part 82 and a rail splitting drive part 81, and one end of the labor division guide rail 71 and the guiding guide rail 72 are provided with a rail splitting gap 73 there between. The rail splitting enforcement part 82 is configurable in a rail sealing position and a rail abdicating position. When the rail splitting enforcement part 82 switches from the rail abdicating position to the rail sealing position, the rail splitting drive part 81 pushes the rail splitting enforcement part 82 into the rail splitting gap 73, and the guide wheel 23 switches from the guiding guide rail 72 to the labor division guide rail 71 through the guidance of the rail splitting enforcement part 82; and when the rail splitting enforcement part 82 switches from the rail sealing position to the rail abdicating position, the rail splitting drive part 81 pulls the rail splitting enforcement part 82 out of the rail splitting gap 73, and the guide wheel 23 continues to slide along the guiding guide rail 72.

In this embodiment, there are two forms of rail merging apparatus 9. One is that the rail merging apparatus 9 comprises a rail merging block 91, and the labor division guide rail 71 and the guiding guide rail 72 are provided with a rail merging gap 74 therebetween, and the rail merging block 91 is located inside the rail merging gap 74 and a fixed end of the rail merging block 91 is provided with a spindle 92; and the spindle 92 and the rail merging block 91 are provided with a torsional spring therebetween, and two ends of the torsional spring are respectively connected to the spindle 92 and the rail merging block 91 to bias a free end of the rail merging block 91 away from the guiding guide rail 72, that is, the rail merging block 91 pops away from the rail merging gap 74. When the guide wheel 23 of the mold mounting part 22 converges from the labor division guide rail 71 into the guiding guide rail 72, the guide wheel 23 will firstly collide with the rail merging block 91 that pops up from the rail merging gap 74, the guide wheel 23 continues to move and roll over the rail merging block 91, and the guide wheel 23 overcomes the biasing force of the torsional spring of the rail merging block 91, and forces the rail merging block 91 to span the rail merging gap 74, so that the guide wheel 23 can smoothly converge from the labor division guide rail 71 onto the guiding guide rail 72. When the guide wheel 23 of the mold mounting part 22 passes by the rail merging gap 74 between the guiding guide rail 72 and the labor division guide rail 71 from the guiding guide rail 72, as the rail merging block 91 maintains the state of popping away from the rail merging gap 74 due to the biasing force of the torsional spring, the guide wheel 23 will not be affected by the rail merging block 91 when passing by the rail merging gap 74, and can as well smoothly pass by the rail merging gap 74 and continue along the guiding guide rail 72.

The second form of rail merging apparatus 9 is that the rail merging apparatus 9 comprises a rail merging enforcement part 93 and a rail merging drive part 94, and the labor division guide rail 71 and the guiding guide rail 72 are provided with a rail merging gap 74 therebetween; the rail merging enforcement part 93 is configurable in a rail sealing position and a rail abdicating position. Where the guide wheel 23 switches from the labor division guide rail 71 to the guiding guide rail 72, the rail merging enforcement part 93 switches from the rail abdicating position to the rail sealing position to make the rail merging drive part 94 push the rail merging enforcement part 93 into the rail merging gap 74, and the guide wheel 23 moves over the rail merging enforcement part 93 from the labor division guide rail 71 and moves onto the guiding guide rail 72. Where the guide wheel 23 continues moving along the guiding guide rail 72, the rail merging enforcement part 93 switches from the rail sealing position to the rail abdicating position to make the rail merging drive part 94 pull the rail merging enforcement part 93 out of the rail merging gap 74, and the guide wheel 23 continues moving on the guiding guide rail 72.

Figure 12:
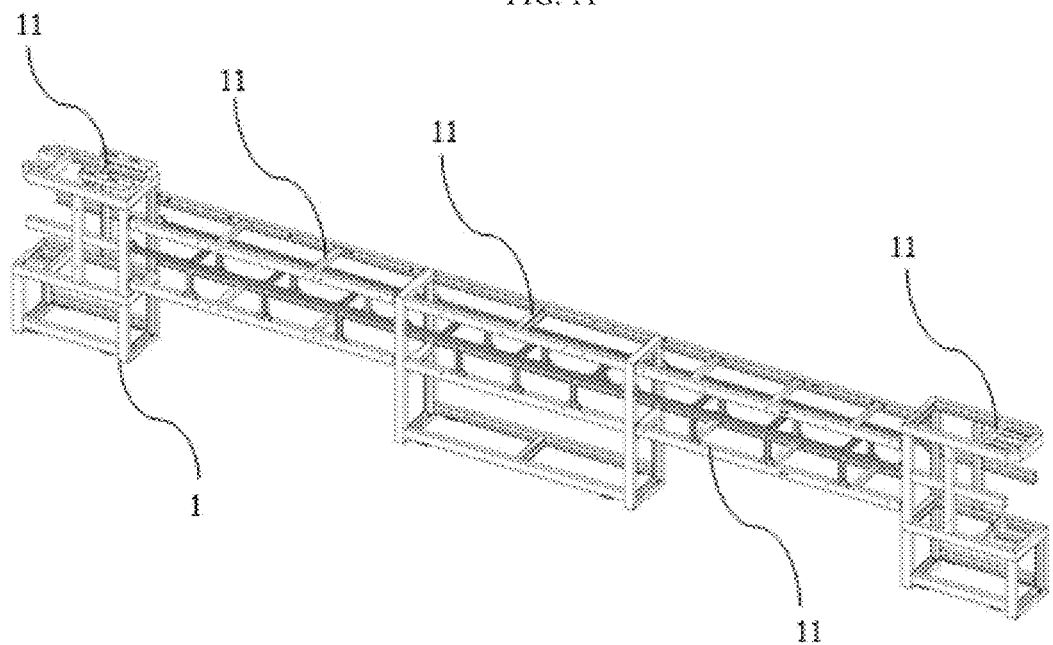
FIG. 12 is a schematic diagram of a rack of the chain wheel transmission guide mechanism for use in condom production of the embodiments of the present invention.

As shown in FIG. 12, the rack 1 comprises a plurality of sections of head-to-tail rack modules 11, and the two chain wheels 31 are respectively located at the head and the tail of the rack modules 11. When the length of the production line needs to be adjusted, the number of rack modules 11 can be increased or decreased, and then the structure such as the auxiliary rail assembly 4 and the guiding assembly 7 is built on the rack modules 11.

In summary, in the chain wheel 31 transmission guide mechanism for use in condom production of the present invention, the axis of the chain wheel 31 of the chain wheel assembly 3 is arranged perpendicular to the horizontal plane, and the mold frame 2 is movably and cooperatively connected to the auxiliary rail assembly 4 through the sliding part 6, which enables the whole section of the chain 5 to be involved in different processes, improving the utilization of the chain 5 and reducing the equipment cost; the chain 5 of the chain wheel assembly 3 only provides a traction force to pull the mold frame 2 to slide along the auxiliary rail assembly 4, and with the addition of the load bearing and position limitation functions of the auxiliary rail assembly 4 to the mold frame 2, the chain 5 does not need to bear the weight of the products any more, and moreover, due to the cooperation of the mold frame 2 and the auxiliary rail assembly 4, the movement direction of the chain 5 is perpendicular to the direction of gravity and reduces gravity's influence on the operation of the chain 5, which greatly reduces the load on the chain 5 and ensures a longer lifespan of the chain 5; and also because the mold bodies 24 are not directly connected to the chain 5, the bending or sagging of the chain 5 will not cause adjacent mold bodies 24 to collide, the spacing between adjacent mold bodies 24 can be further decreased, and the volume of production can be increased, and moreover, due to the indirect connection of the chain 5 and the mold bodies 24, the lubricating oil on the chain 5 will not contaminate the mold bodies 24.

What is stated above is just preferential implementation of the present invention. It should be noted that for a person of ordinary skill in the art, several improvements and replacements can also be made without deviating from the technical principle of the present invention, and these improvements and replacements should also be regarded as the scope of protection of the present invention.

The invention claimed is:

1. A chain wheel transmission guide mechanism for use in condom production, comprising a rack and a mold frame, wherein the rack is provided with a chain wheel assembly and an auxiliary rail assembly arranged in parallel with a chain of the chain wheel assembly, the auxiliary rail assembly comprises an upper load bearing guide rail and a lower limiting guide rail which are disposed in parallel, and the chain wheel assembly comprises two chain wheels which are respectively located at both ends in the length direction of the rack and are axially perpendicular to a horizontal plane and the chain connecting and meshing the two chain wheels; the mold frame is connected to the chain, the upper and lower ends of the mold frame are respectively provided with an upper sliding part and a lower sliding part, and the mold frame is movably and cooperatively connected to the upper load bearing guide rail and the lower limiting guide rail respectively through the upper sliding part and the lower sliding part; and the mold frame moves along the auxiliary rail assembly under the traction of the chain.

2. The chain wheel transmission guide mechanism for use in condom production of claim 1, wherein the auxiliary rail assembly is disposed around the rack.

3. The chain wheel transmission guide mechanism for use in condom production of claim 1, wherein the rack is provided with a guiding assembly in parallel with the chain, the mold frame comprises a vertically disposed lifting guide rail and a mold mounting part movably and cooperatively connected to the lifting guide rail, the mold mounting part is provided with a guide wheel, and the guide wheel is movably and cooperatively connected to the guiding assembly; and when the chain pulls the mold frame to slide on the auxiliary rail assembly, the guide wheel brings the mold mounting part to slide along the lifting guide rail under the guidance of the guiding assembly.

4. The chain wheel transmission guide mechanism for use in condom production of claim 3, wherein the guiding assembly comprises a labor division apparatus and a labor division guide rail and a guiding guide rail which are spaced apart vertically, the labor division apparatus comprises a rail splitting apparatus and a rail merging apparatus, and the labor division guide rail and the guiding guide rail are respectively provided with a rail splitting apparatus and a rail merging apparatus therebetween.

5. The chain wheel transmission guide mechanism for use in condom production of claim 4, wherein the labor division guide rail is a curve rail, a straight rail or a polyline rail.

6. The chain wheel transmission guide mechanism for use in condom production of claim 4 or 5, wherein the guiding guide rail is a curve rail, a straight rail or a polyline rail.

7. The chain wheel transmission guide mechanism for use in condom production of claim 4, wherein the rail splitting apparatus comprises a rail splitting enforcement part and a rail splitting drive part, and the labor division guide rail and the guiding guide rail are provided with a rail splitting gap therebetween;

the rail splitting enforcement part has a rail sealing position and a rail abdicating position, when the rail splitting enforcement part switches from the rail abdicating position to the rail sealing position, the rail splitting drive part pushes the rail splitting enforcement part into the rail splitting gap, and the guide wheel switches from the guiding guide rail to the labor division guide rail through the guidance of the rail splitting enforcement part; and when the rail splitting enforcement part switches from the rail sealing position to the rail abdicating position, the rail splitting drive part pulls the rail splitting enforcement part out of the rail splitting gap, and the guide wheel moves along the guiding guide rail.

8. The chain wheel transmission guide mechanism for use in condom production of claim 4, wherein the rail merging apparatus comprises a rail merging block, the labor division guide rail and the guiding guide rail are provided with a rail merging gap therebetween, and the rail merging block is located inside the rail merging gap and a fixed end of the rail merging block is provided with a spindle; and the spindle and the rail merging block are provided with a torsional spring therebetween, and two ends of the torsional spring are respectively connected to the spindle and the rail merging block to bias a free end of the rail merging block away from the guiding guide rail.

9. The chain wheel transmission guide mechanism for use in condom production of claim 4, wherein the rail merging apparatus comprises a rail merging enforcement part and a rail merging drive part, and the labor division guide rail and the guiding guide rail are provided with a rail merging gap therebetween;

the rail merging enforcement part has a rail sealing position and a rail abdicating position; in the process that the guide wheel switches from the labor division guide rail to the guiding guide rail, the rail merging enforcement part switches from the rail abdicating position to the rail sealing position to make the rail merging drive part push the rail merging enforcement part into the rail merging gap, and the guide wheel moves over the rail merging enforcement part from the labor division guide rail and switches into the guiding guide rail; and in the process that the guide wheel continues moving on the guiding guide rail, the rail merging enforcement part switches from the rail sealing position to the rail abdicating position to make the rail merging drive part pull the rail merging enforcement part out of the rail merging gap, and the guide wheel continues moving on the guiding guide rail.

10. The chain wheel transmission guide mechanism for use in condom production of claim 1, wherein the rack comprises a plurality of sections of head-to-tail rack modules, and the two chain wheels are respectively located at the head and the tail of the rack modules.

* * * * *